(12) United States Patent
Xu

(10) Patent No.: US 8,937,958 B2
(45) Date of Patent: Jan. 20, 2015

(54) ROUTER AND MANY-CORE SYSTEM

(75) Inventor: Hui Xu, Fujisawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 176 days.

(21) Appl. No.: 13/615,205

(22) Filed: Sep. 13, 2012

(65) Prior Publication Data

US 2013/0322459 A1   Dec. 5, 2013

(30) Foreign Application Priority Data

May 31, 2012   (JP) .................... 2012-124862

(51) Int. Cl.
*H04L 12/28* (2006.01)
*H04L 12/861* (2013.01)
*H04L 12/54* (2013.01)
*H04L 12/933* (2013.01)

(52) U.S. Cl.
CPC .............. *H04L 49/90* (2013.01); *H04L 12/54* (2013.01); *H04L 12/5693* (2013.01); *H04L 49/103* (2013.01)
USPC ..................... 370/395.71; 370/412; 370/428

(58) Field of Classification Search
CPC ......... H04L 45/00; H04L 45/60; H04L 47/10; H04L 49/90; H04L 49/103; H04L 49/109; H04L 49/9021; H04L 49/9026; H04L 2012/5681; H04L 1/1835; H04L 47/30; H04L 49/10; H04L 12/54; H04L 12/5693

USPC ............ 370/230, 231, 235, 392, 474, 395.71, 370/412, 413, 414–418, 428, 429
See application file for complete search history.

(56) References Cited

U.S. PATENT DOCUMENTS

| | | | | |
|---|---|---|---|---|
| 5,898,826 | A | * | 4/1999 | Pierce et al. .................... 714/4.2 |
| 7,221,647 | B2 | * | 5/2007 | Moriwaki et al. ............. 370/230 |
| 7,436,845 | B1 | * | 10/2008 | Rygh et al. ..................... 370/413 |
| 2003/0227932 | A1 | * | 12/2003 | Meempat et al. ............. 370/415 |
| 2011/0058569 | A1 | | 3/2011 | Harrand |
| 2012/0047220 | A1 | | 2/2012 | Usui |
| 2013/0304841 | A1 | * | 11/2013 | Hummel et al. ............... 709/212 |

FOREIGN PATENT DOCUMENTS

| | | |
|---|---|---|
| JP | H08-251196 | 9/1996 |
| JP | 2011-061775 | 3/2011 |
| JP | 2012-043350 | 3/2012 |

* cited by examiner

*Primary Examiner* — Jeffrey M Rutkowski
*Assistant Examiner* — Harun Chowdhury
(74) *Attorney, Agent, or Firm* — Knobbe, Martens, Olson & Bear LLP

(57) ABSTRACT

According to one embodiment, a router includes a plurality of input ports and a plurality of output ports. The input ports receive a packet including control information indicating a type of access. Each of the input ports includes a first buffer and a second buffer which store the packet. The output ports output the packet. Each of the input ports selects at least one of the first buffer and the second buffer as a buffer in which the packet is stored on the basis of the control information and a state of the output port serving as a destination port of the packet.

15 Claims, 11 Drawing Sheets

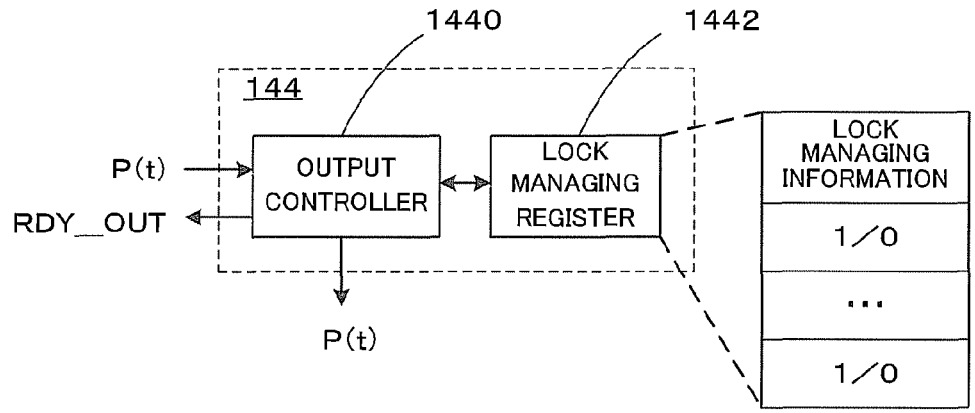

FIG. 5

| No. | STATE OF OUTPUT PORT BEFORE INPUT | TYPE OF ACCESS | ACCESS SOURCE | FORWARDING CHANNEL | BUFFER TO BE USED |
|---|---|---|---|---|---|
| (1) | UNLOCK STATE | NORMAL ACCESS | ALL INPUT PORTS | FIRST CHANNEL | FIRST BUFFER SECOND BUFFER |
| (2) | UNLOCK STATE | LOCK ACCESS | ALL INPUT PORTS | FIRST CHANNEL | FIRST BUFFER SECOND BUFFER |
| (3) | LOCK STATE | NORMAL ACCESS | SAME INPUT PORT | SECOND CHANNEL | SECOND BUFFER |
| (4) | LOCK STATE | NORMAL ACCESS | OTHER INPUT PORT | SECOND CHANNEL (READY) | SECOND BUFFER |
| (5) | LOCK STATE | UNLOCK ACCESS | SAME INPUT PORT | THIRD CHANNEL | FIRST BUFFER |
| (6) | LOCK STATE | LOCK ACCESS | OTHER INPUT PORT | SECOND CHANNEL (READY) | SECOND BUFFER |
| (7) | LOCK STATE | UNLOCK ACCESS | OTHER INPUT PORT | SECOND CHANNEL (READY) | SECOND BUFFER |

FIG. 6

| STATE OF OUTPUT PORT BEFORE INPUT | LOCK BIT (LB(t1)) | UNLOCK BIT (ULB(t1)) | FORWARDING CHANNEL | STATE OF OUTPUT PORT AFTER OUTPUT |
|---|---|---|---|---|
| UNLOCK STATE | 0 | 1 | FIRST CHANNEL | UNLOCK STATE |
| | 0 | 0 | FIRST CHANNEL | UNLOCK STATE |

| STATE OF OUTPUT PORT BEFORE INPUT | LOCK BIT (LB(t2)) | UNLOCK BIT (ULB(t2)) | FORWARDING CHANNEL | STATE OF OUTPUT PORT AFTER OUTPUT |
|---|---|---|---|---|
| UNLOCK STATE | 1 | 1 | FIRST CHANNEL | LOCK STATE |
| | 1 | 0 | FIRST CHANNEL | LOCK STATE |

| STATE OF OUTPUT PORT BEFORE INPUT | LOCK BIT (LB(t3)) | UNLOCK BIT (ULB(t3)) | FORWARDING CHANNEL | STATE OF OUTPUT PORT AFTER OUTPUT |
|---|---|---|---|---|
| LOCK STATE | 1 | 1 | SECOND CHANNEL | LOCK STATE |
|  | 1 | 0 | SECOND CHANNEL | LOCK STATE |

| STATE OF OUTPUT PORT BEFORE INPUT | LOCK BIT (LB(t3)) | UNLOCK BIT (ULB(t3)) | FORWARDING CHANNEL | STATE OF OUTPUT PORT AFTER OUTPUT |
|---|---|---|---|---|
| LOCK STATE | 1 | 1 | SECOND CHANNEL (READY) | LOCK STATE |
| | 0 | 1 | SECOND CHANNEL (READY) | LOCK STATE |
| | 0 | 0 | SECOND CHANNEL | LOCK STATE |
| | 1 | 0 | SECOND CHANNEL (READY) | LOCK STATE |

| STATE OF OUTPUT PORT BEFORE INPUT | LOCK BIT (LB(t5)) | UNLOCK BIT (ULB(t5)) | FORWARDING CHANNEL | STATE OF OUTPUT PORT AFTER OUTPUT |
|---|---|---|---|---|
| LOCK STATE | 1 | 1 | THIRD CHANNEL | UNLOCK STATE |
| | 0 | 1 | THIRD CHANNEL | UNLOCK STATE |

ROUTER AND MANY-CORE SYSTEM

CROSS REFERENCE TO RELATED APPLICATION(S)

This application is based upon and claims the benefit of priority from the prior Japanese Patent Application No. 2012-124862, filed on May 31, 2012, the entire contents of which are incorporated herein by reference.

FIELD

Embodiments described herein relate generally to a router and a many-core system.

BACKGROUND

A many-core system includes plural cores and at least one router. In the conventional many-core system, for example, in the case that a data packet is forwarded to a memory through a router, a core locks a path that is used to forward the data packet.

In this case, other cores cannot use the locked path. Accordingly, in order to use the locked path, other cores are brought to a deadlock state in which the cores have to wait until the path is unlocked.

In contrast, a method for providing virtual channels in each router port one is dedicated to an unlock packet, others can be used by other cores if they have different destination as the locked core. However, in the case of this method, a size and power consumption of the router increase. That is, in the conventional many-core system, the deadlock state cannot be avoided without increasing the size and the power consumption of the router.

BRIEF DESCRIPTION OF THE DRAWINGS

FIG. 5 is a block diagram illustrating a configuration of the output port 144 of the first embodiment.

FIG. 6 is an explanatory view of an operating pattern of the input port 140 of the first embodiment.

DETAILED DESCRIPTION

Embodiments will now be explained with reference to the accompanying drawings.

In general, according to one embodiment, a router includes a plurality of input ports and a plurality of output ports. The input ports receive a packet including control information indicating a type of access. Each of the input ports includes a first buffer and a second buffer which store the packet. The output ports output the packet. Each of the input ports selects at least one of the first buffer and the second buffer as a buffer in which the packet is stored on the basis of the control information and a state of the output port serving as a destination port of the packet.

Figure 1:
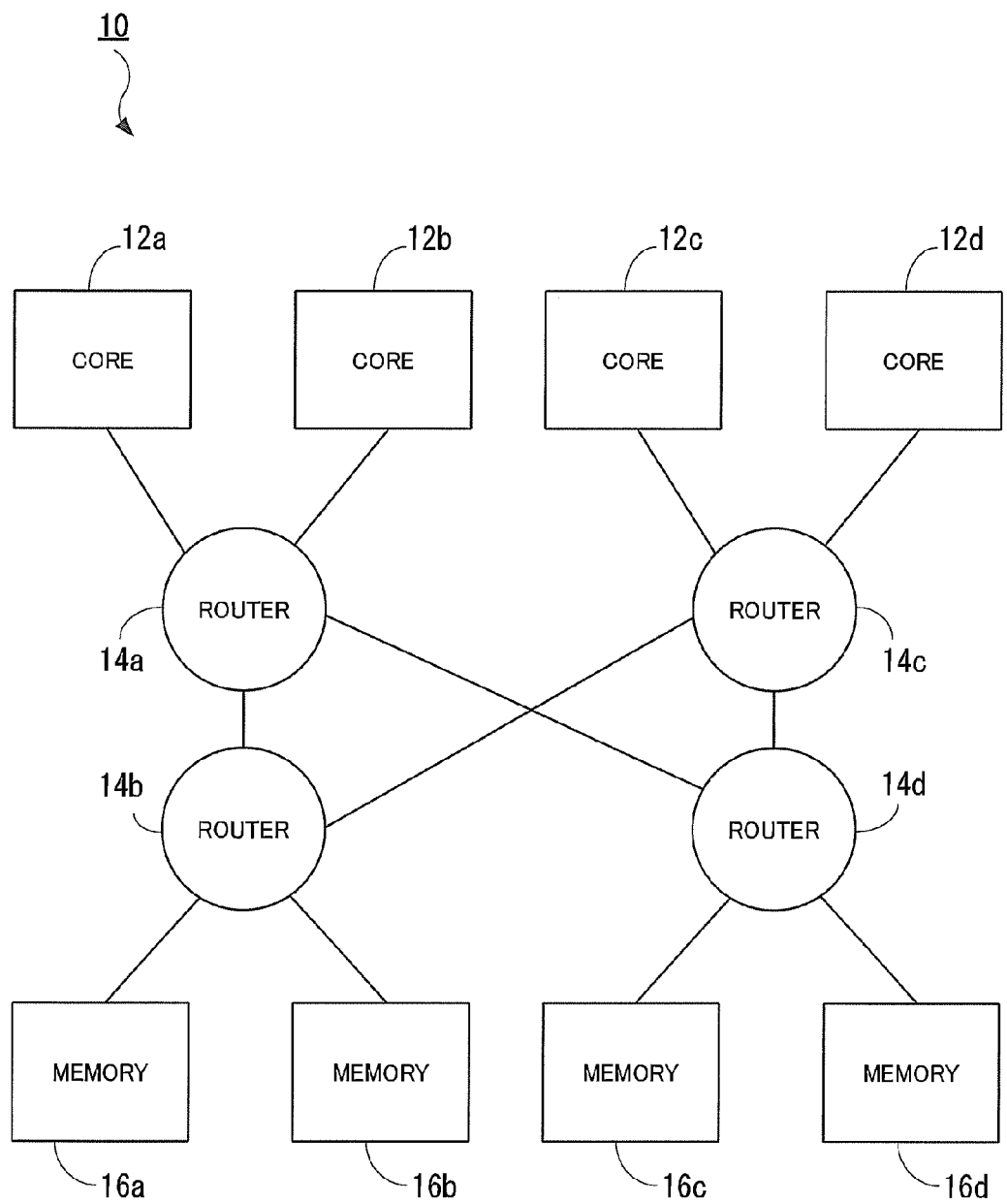
FIG. 1 is a block diagram illustrating an example of a network topology of a many-core system 10 of the embodiment.

A configuration of a many-core system according to an embodiment will be described. FIG. 1 is a block diagram illustrating an example of a network topology of a many-core system 10 of the embodiment. The many-core system 10 includes plural cores 12a to 12d, plural routers 14a to 14d, and plural memories 16a to 16d. Hereinafter, occasionally the cores 12a to 12d are referred to as a "core 12", the routers 14a to 14d are referred to as a "router 14", and the memories 16a to 16d are referred to as a "memory 16".

The core 12 issues a read request and a write request to the memory 16, and performs data processing with respect to response to the read request. For example, the core 12 is a CPU (Central Processing Unit). The router 14 controls a data forwarding route. The data is stored in the memory 16. For example, the memory 16 is a secondary cache or an external memory (for example, DRAM (Dynamic Random Access Memory)).

Moreover, each of the core 12 and the memory 16 includes an interface. The interface converts each of the read request, the write request, and the response into a packet that can be forwarded by the router 14, and sets lock control information to the packet in order to control a state (lock state or unlock state) of a port in the router 14.

Figure 2A:
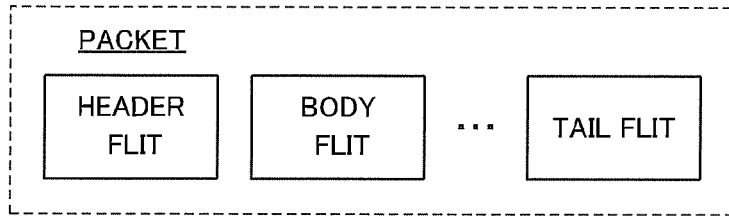
FIGS. 2A to 2D are schematic diagrams illustrating an example of the packet of the embodiment.

FIGS. 2A to 2D are schematic diagrams illustrating an example of the packet of the embodiment. The packet includes a header flit, at least one body flit, and a tail flit (FIG. 2A). Incidentally, in the case of a read request packet, the body flit and the tail flit may be eliminated.

Figure 2B:
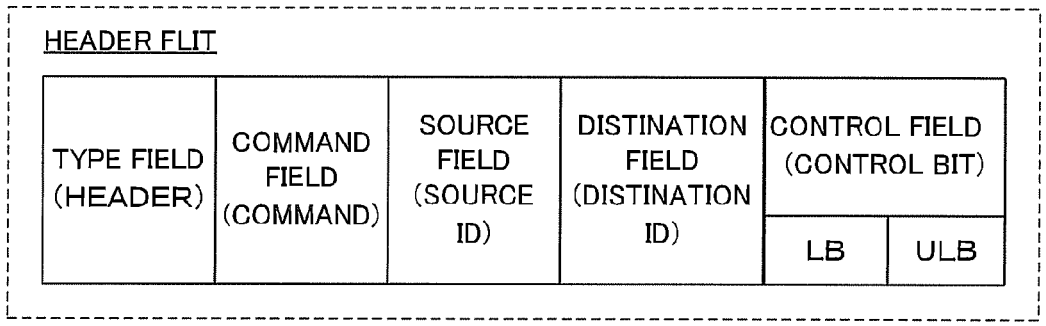

The header flit includes a type field, a command field, a source field, a destination field, and a control field (FIG. 2B). Type information "HEADER" indicating the header flit is set to the type field. A command (for example, write request command) provided to the packet is set to the command field. A source ID indicating a forwarding source module of the packet is set to the source field. For example, the source ID indicates one of the cores 12a to 12d. A destination ID indicating at least one of the routers 14a to 14d and the memories 16a to 16d is set to the destination field. For example, the destination ID indicates one of the memories 16a to 16d.

Control information CB is set to the control field. The control information CB is a combination of a lock bit LB (for example, 1-bit signal) and an unlock bit ULB (for example, 1-bit signal). The lock bit LB indicates whether an output port of the router should be locked. The unlock bit LB indicates whether the output port should be unlocked. The configuration of the control information CB is not limited to this embodiment.

Figure 2C:
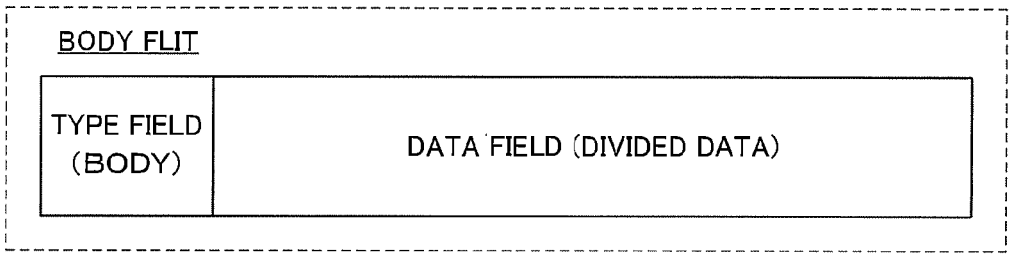
Figure 2D:
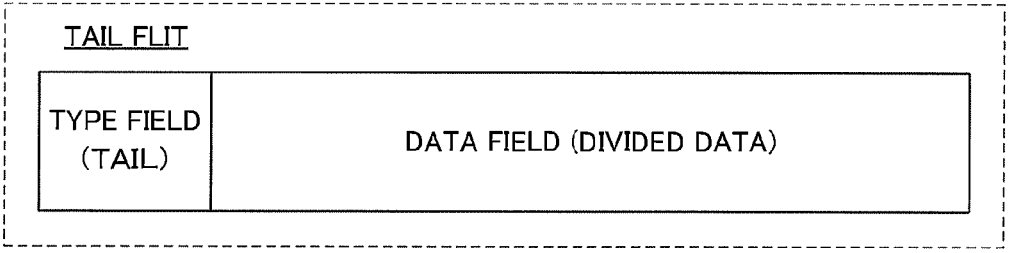

The body flit includes a type field and a data field (FIG. 2C). Type information "BODY" indicating the body flit is set to the type field. The tail flit includes a type field and a data field (FIG. 2D). Type information "TAIL" indicating the tail flit is set to the type field. The data field includes data (hereinafter referred to as "divided data") in which data to be written (hereinafter referred to as "write data") is divided. For example, in the case that a 1-line size has 256 bytes while the divided data has 64 bytes, the body flit includes three body flits and one tail flit.

Figure 3:
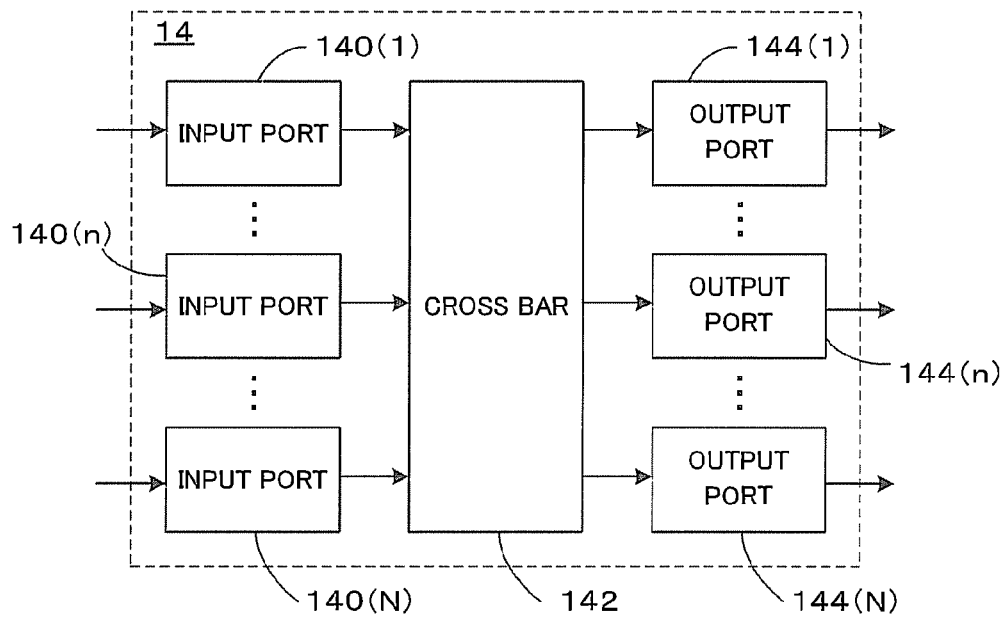
FIG. 3 is a block diagram illustrating a configuration of the router 14 of the embodiment.

FIG. 3 is a block diagram illustrating a configuration of the router 14 of the embodiment. The router 14 includes plural input ports 140(n) (n: 1 to N (N is integers of 2 or more)), a crossbar 142, and plural output ports 144(n). The input port receives the packet. The crossbar 142 refers to the header flit of the packet P(t) received at a time t, and forwards the packet P(t) to the output port 144(n) corresponding to the destination ID on the basis of a predetermined algorithm (for example, Round-Robin algorithm). The output port 144(n) outputs the packet P(t), which is forwarded from the crossbar, to a forwarding destination module.

The header flit, the body flit, and the tail flit are received to the router 14 in this order. For example, when the output port 144(n) outputs the header flit of the packet P(t) at the time t, the output port 144(n) is not interrupted with other packet (for example, packet P(t+1) at time (t+1)) until the tail flit of the packet P(t) is outputted.

First Embodiment

In a first embodiment, by way of example, the input port 140 forwards the packet forwarded from superordinate module to a subordinate module while dynamically switching forwarding channels.

Figure 4:
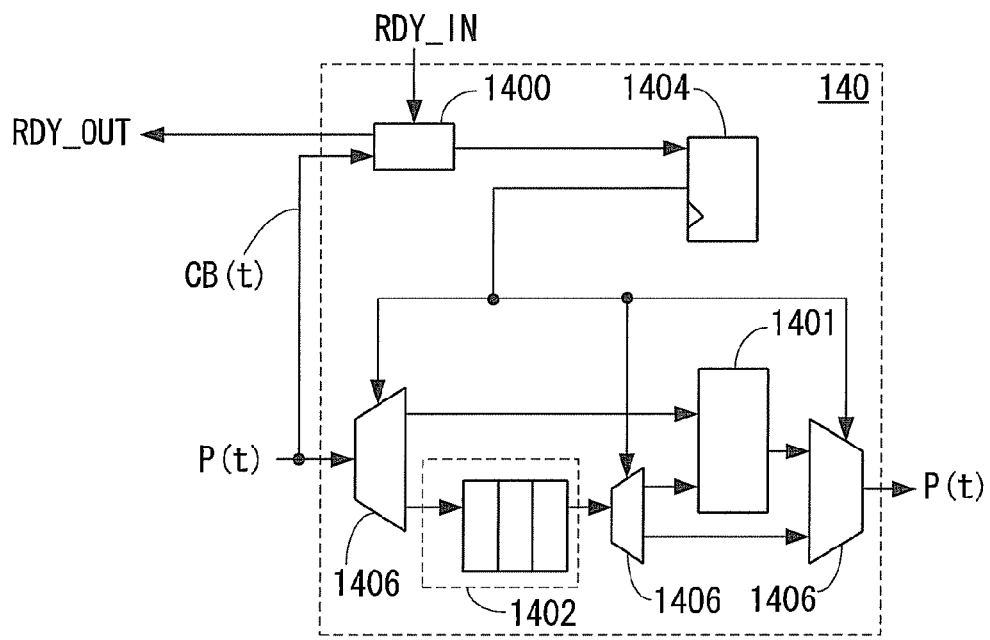
FIG. 4 is a block diagram illustrating a configuration of the input port 140 of the first embodiment.

FIG. 4 is a block diagram illustrating a configuration of the input port 140 of the first embodiment. The input port 140 includes an input controller 1400, first and second buffers (internal buffers) 1401 and 1402, a lock control register 1404, and a selector 1406. Each of the first and second buffers 1401 and 1402 acts as a FIFO (First-In-First-Out) memory, or the first and second buffers 1401 and 1402 act as the FIFO memory in a combination.

The input controller 1400 receives an internal ready signal RDY_IN from the output port 144. The internal ready signal RDY_IN indicates that the output port 144 can receive the packet from the input port 140.

Moreover, the input controller 1400 outputs an external ready signal RDY_OUT to a superordinate module (that is, the module connected to the input port 140). The external ready signal RDY_OUT indicates that the input port 140 can receive the packet from the superordinate module.

The input controller 1400 sets output port state information (for example, one-bit signal), which indicates a state of the output port 144 serving as a destination port, to the lock control register 1404. The selector 1406 selects a forwarding channel to be used to forward the packet on the basis of the control information CB (that is, the lock bit LB and the unlock bit ULB) of the header flit and the output port state information set to the lock control register 1404.

FIG. 5 is a block diagram illustrating a configuration of the output port 144 of the first embodiment. The output port 144 includes an output controller 1440 and a lock managing register 1442.

The output controller 1440 outputs a packet P(t) to the subordinate module (that is, the module connected to the output port 144).

The output controller 1440 sets lock managing information to the lock managing register 1442. The lock managing information includes information (for example, N lock managing bits) indicating the input port 140 that is locked together with the output port 144. For example, as to the lock managing information of the output port 144(N), in the case that the first lock managing bit is "1" while the second to Nth lock managing bits are "0", the lock managing information means that the output port 144(N) is locked by the input port 140(1).

An operation of the router 14 of the first embodiment will be described. FIG. 6 is an explanatory view of an operating pattern of the input port 140 of the first embodiment. The input port 140 uses the forwarding channel (one of first to third channels) in accordance with a combination of the state (unlock state or lock state) of the output port 144 and a type (normal access, lock access, or open access) of access, which depends on control information CB(t).

In the normal access, lock and unlock of the output port 144 are unnecessary. In the lock access, the lock of the output port 144 is necessary. In the unlock access, the unlock of the output port 144 is necessary.

The first channel is a forwarding channel in which both the first buffer 1401 and the second buffer 1402 are used (that is, the first channel is formed by the first and second buffers 1401 and 1402). The second channel is a forwarding channel in which the second buffer is used while the first buffer is not used (that is, the second channel is formed by the second buffer 1402). The third channel is a forwarding channel in which the first buffer is used while the second buffer is not used (that is, the third channel is formed by the first buffer 1401).

In the case that the output port 144 is in the unlock state (No. (1) or (2)), irrespective of the type of access, the first channel is selected with respect to the accesses from all the input ports 140.

In the case that the output port 144 is in the lock state, the forwarding channel varies depending on the type of access and an access source. The second channel is selected in the normal access (No. (3)) from the input port (hereinafter referred to as "same input port") that is locked together with the output port 144. The second channel is selected in the normal access (No. (4)) from the input port (hereinafter referred to as "other input port") in which the output port 144 is not locked. The third channel is selected in the unlock access (No. (5)) from the same input port. The second channel is selected in the lock access or the unlock access (No. (6) or (7)) from other input port. In Nos. (4), (6), and (7), the packet waits in the second buffer 1402 until the lock state is changed to the unlock state.

FIGS. 7A, 7B, 8A, 8B, 9A, 9B, 10A, 10B, 11A, and 11B are views illustrating examples of the operation of the input port 140 of the first embodiment. FIGS. 7A, 7B, 8A, 8B, 9A, 9B, 10A, 10B, 11A, and 11B sequentially illustrate the operation to output the received packet to the output port 144(1) at times t1 to t5.

Figures 7A, 7B:
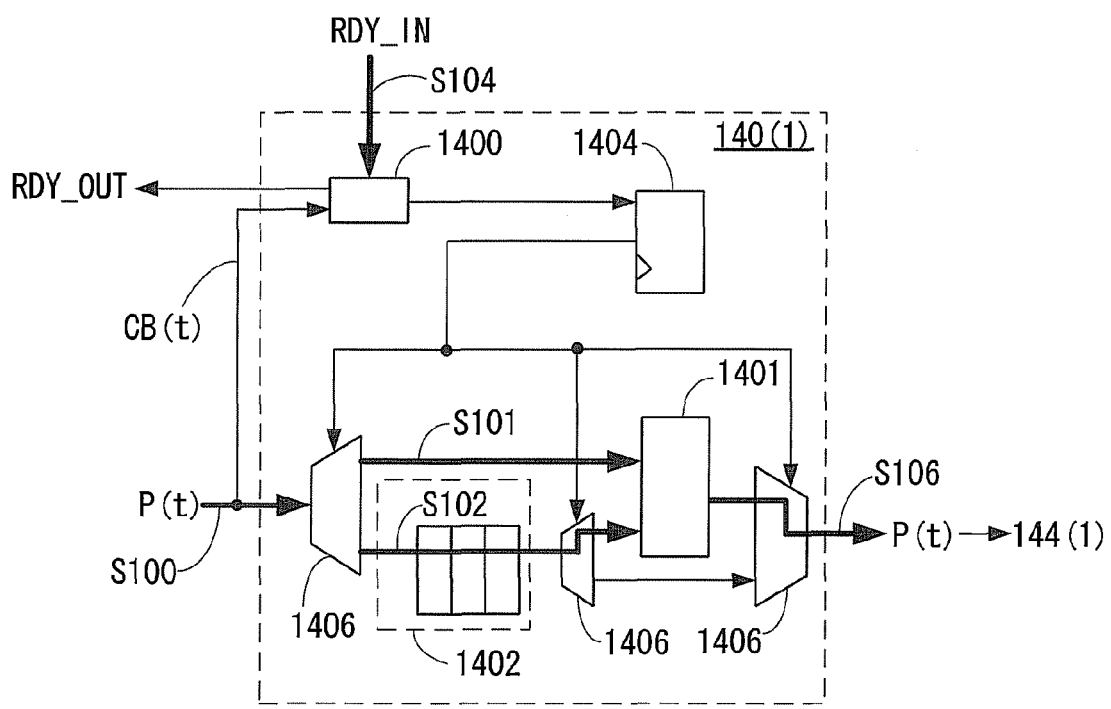
FIGS. 7A, 7B, 8A, 8B, 9A, 9B, 10A, 10B, 11A, and 11B are views illustrating examples of the operation of the input port 140 of the first embodiment.

FIGS. 7A and 7B correspond to No. (1) in FIG. 6. At the time t1, the output port 144(1) is in the unlock state (output port state information=0). At this point, when a packet P(t1) of the normal access (lock bit LB(t1)=0 and unlock bit ULB (t1)=1 or 0), in which the destination port of the packet P(t1) is the output port 144(1), is inputted to the input port 140(1) (S100), the selector 1406 selects path to be used to forward packet in accordance with a status of the first buffer 1401. In the case that the first buffer 1401 has an empty, the selector 1406 selects a path in which the packet P(t1) is supplied to the first buffer 1401 without passing through the second buffer 1402 (S101). In the case that the first buffer 1401 has no empty, the selector 1406 selects a path in which the packet P(t1) is supplied to the first buffer 1401 through the second buffer 1402 (that is, the packet P(t1) waits in the second buffer 1402 until the first buffer 1401 has the empty) (S102).

That is, the selector 1406 selects the first channel in the case that the type of access is the normal access while the output port 144 is in the unlock state. As a result, the packet P(t1) is output to the output port 144(1) through at least the first buffer 1401.

On the basis of the internal ready signal RDY_IN from the output port 144(1) (S104), the input controller 1400 outputs the packet P(t1) stored in the first buffer 1401 (S106). In this case, the output port state information=0 set to the lock control register 1404 is maintained.

Figures 8A, 8B:
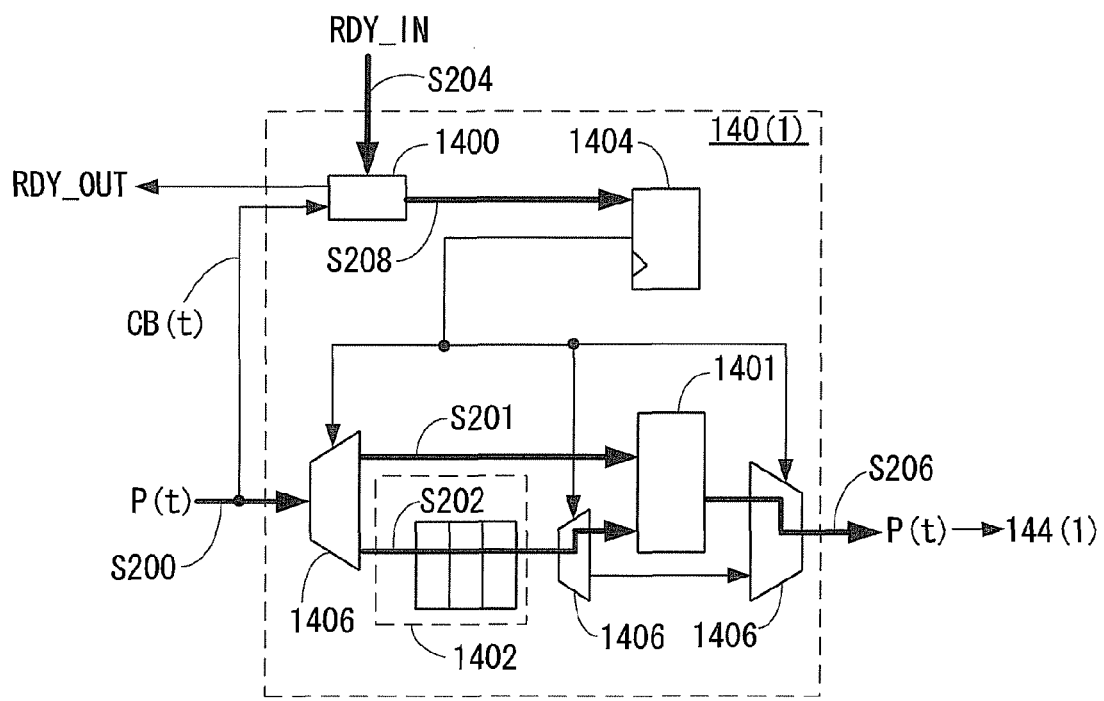

FIGS. 8A and 8B correspond to No. (2) in FIG. 6. At the time t2, the output port 144(1) is in the unlock state (output port state information=0). At this point, when a packet P(t2) of the lock access (lock bit LB(t2)=1 and unlock bit ULB(t2)=1 or 0), in which the destination port of the packet P(t2) is the output port 144(1), is inputted to the input port 140(1) (S200), the selector 1406 selects the path to be used to forward packet in accordance with the status of the first buffer 1401. In the case that the first buffer 1401 has the empty, the selector 1406 selects the path in which the packet P(t2) is supplied to the first buffer 1401 without passing through the second buffer 1402 (S201). In the case that the first buffer 1401 has no empty, the selector 1406 selects the path in which the packet P(t2) is supplied to the first buffer 1401 through the second buffer 1402 (S202). That is, the selector 1406 selects the first channel as the forwarding channel to store the packet P(t2) in at least the first buffer 1401.

When receiving the internal ready signal RDY_IN from the output port 144(1) (S204), the input controller 1400 outputs the packet P(t2) stored in the first buffer 1401 (S206). As a result, "1" is set to the first lock managing bit of the lock managing information on the output port 144(1) (that is, the output port 144(1) is locked by the input port 140(1)). When a tail flit TF(t2) is outputted, the input controller 1400 sets output port state information=1 to the lock control register 1404 (S208).

Figures 9A, 9B:
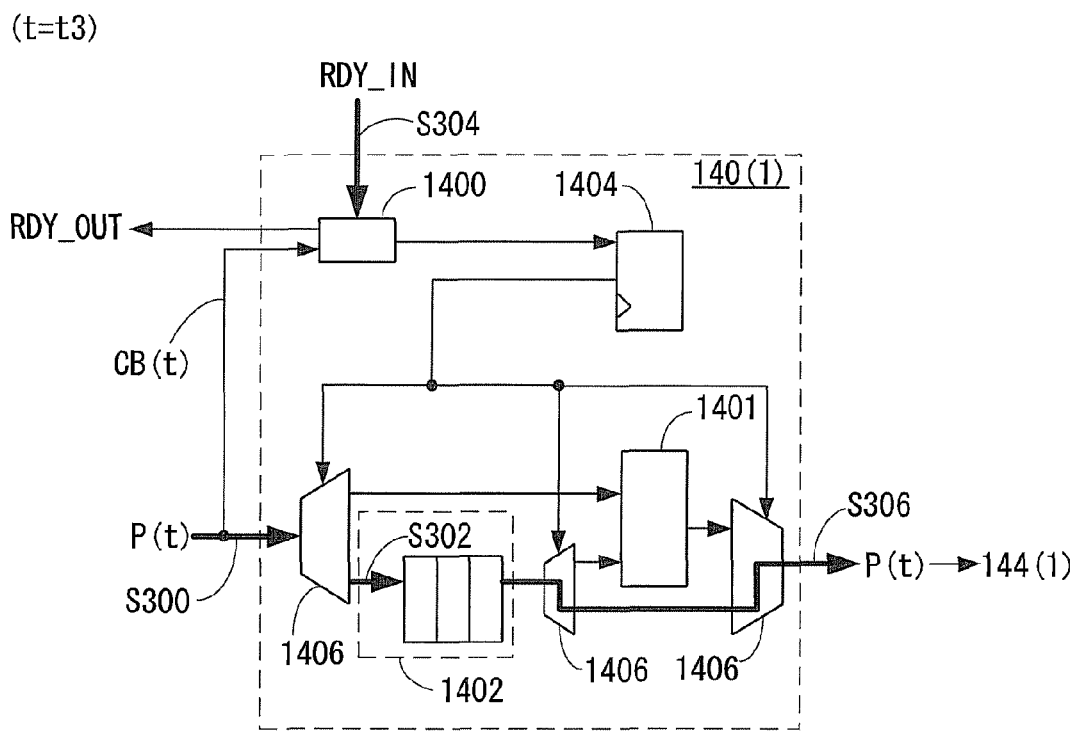

FIGS. 9A and 9B correspond to No. (3) in FIG. 6. At the time t3, the output port 144(1) is in the lock state (output port state information=1). At this point, when a packet P(t3) of the normal access (lock bit LB(t3)=0 and unlock bit ULB(t3)=1 or 0), the destination port of the packet P(t3) is the output port 144(1), is inputted to the input port 140(1) (that is, the same input port) (S300), the selector 1406 selects the path in which the packet P(t3) is supplied to the second buffer 1402 (S302).

That is, the selector 1406 selects the second channel, in which the second buffer 1402 is included while the first buffer 1401 is not included, as the forwarding channel. As a result, the packet P(t3) is stored in the second buffer 1402. On the other hand, the packet P(t3) is not stored in the first buffer 1401.

When receiving the internal ready signal RDY_IN from the output port 144(1) (S304), the input controller 1400 outputs the packet P(t3) stored in the second buffer 1402 (S306). In this case, the output port state information=0 set to the lock control register 1404 at the time t2 is maintained.

Figures 10A, 10B:
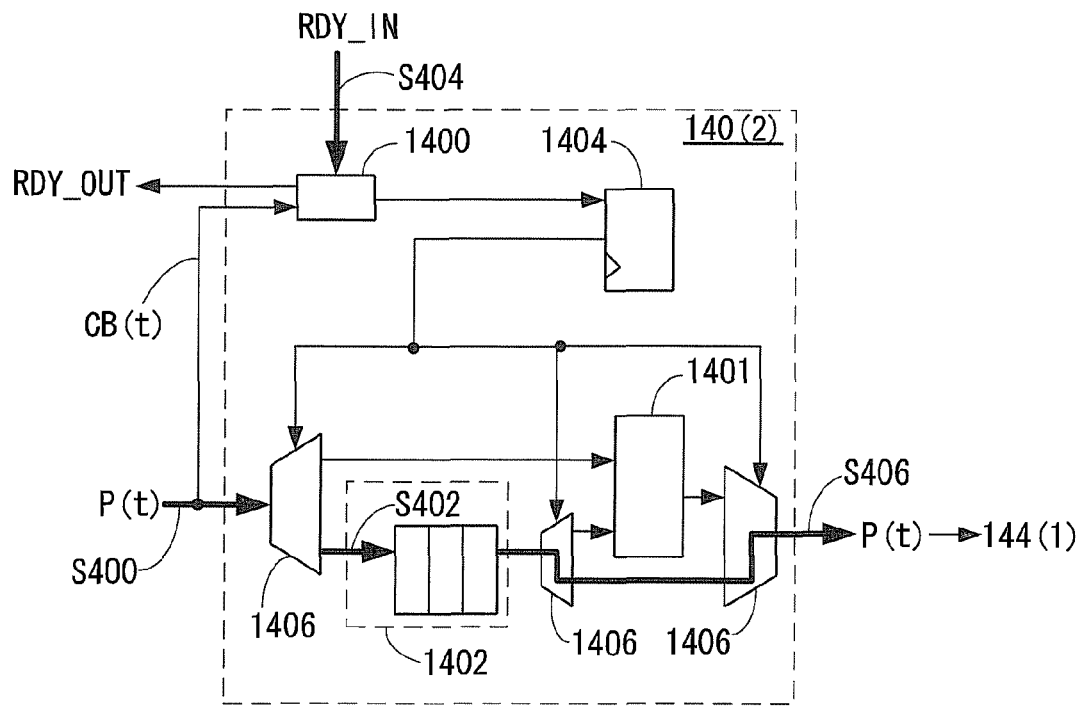

FIGS. 10A and 10B correspond to No. (4) in FIG. 6. At the time t4, the output port 144(1) is in the lock state (output port state information=1). At this point, when a packet P(t4) of the normal access (lock bit LB(t4)=0 and unlock bit ULB(t4)=0), the destination port of the packet P(t4) is the output port 144(1), is inputted to the input port 140(2) (that is, other input port) (S400), the selector 1406 selects the path in which the packet P(t4) is supplied to the second buffer 1402 (S402). Incidentally, when the packet P(t4) of the access (at least one of the lock bit LB(t4) and the unlock bit ULB(t4) is "1") except the normal access is inputted to the input port 140(2) (that is, other input port) (S400), the packet P(t4) waits in the second buffer 1402 until the lock state is changed to the unlock state.

When receiving the internal ready signal RDY_IN from the output port 144(1) (S404), in the case that the packet P(t4) is stored in the second buffer 1402, the input controller 1400 outputs the packet P(t4) (S406). In this case, the output port state information=1 set to the lock control register 1404 at the time t2 is maintained.

Figures 11A, 11B:
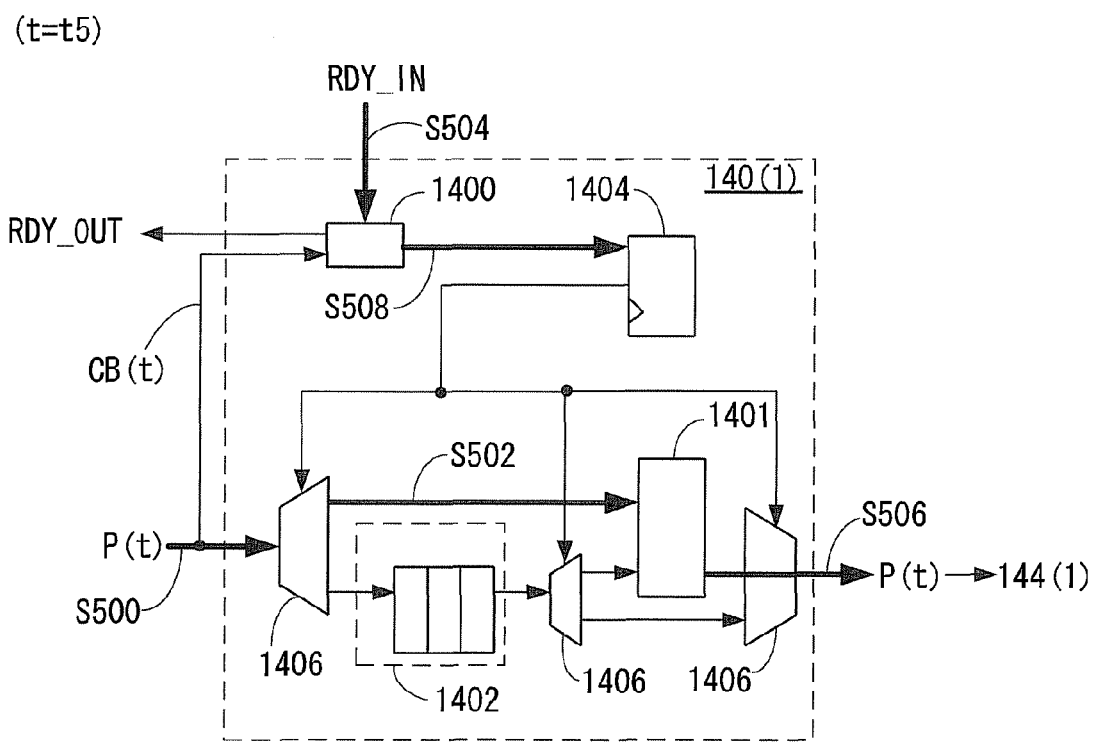

FIGS. 11A and 11B correspond to No. (5) in FIG. 6. At the time t5, the output port 144(1) is in the lock state (output port state information=1). At this point, when a packet P(t5) of the unlock access (lock bit LB(t5)=1 or 0 and unlock bit ULB(t5)=1), in which the destination port of the packet P(t5) is the output port 144(1), is inputted to the input port 140(1) (that is, the same input port) (S500), the selector 1406 selects the path in which the packet P(t5) is directly supplied to the first buffer 1401 (S502).

That is, the selector 1406 selects the third channel, in which the first buffer 1401 is included while the second buffer 1402 is not included, as the forwarding channel. As a result, the packet P(t5) is stored in the first buffer 1401.

When receiving the internal ready signal RDY_IN from the output port 144(1) (S504), the input controller 1400 outputs the packet P(t5) stored in the first buffer 1401 (S506). As a result, "0" is set to the first lock managing bit of the lock managing information on the output port 144(1) (that is, the output port 144(1) is unlocked by the input port 140(1)). When a tail flit TF(t5) is outputted, the input controller 1400 sets output port state information=0 to the lock control register 1404 (S508).

According to the first embodiment, the input port 140 includes the first to third channels, and selects the forwarding channel from the first to third channels in accordance with the type of access and the access source. Therefore, even if the output port 144 is in the lock state, the packet of the normal access or the unlock access can be outputted to the output port 144. The deadlock state of the many-core system 10 can be avoided without increasing the size and the power consumption of the router 14, and therefore the packet forwarding latency can be improved.

Second Embodiment

In a second embodiment, by way of example, an arbitrary number of buffers are included between the routers, and the packet is forwarded while an inter-router flow control system (a valid system in which control is performed on the basis of a valid bit and a credit system in which control is performed on the basis of a credit bit indicating the number of transmissible flits) is dynamically switched. The same description as the first embodiment is omitted.

In the valid system, when the inter-router buffer has the empty, the output port 144 of the forwarding-destination module outputs the packet even if the internal buffer of the input port 140 of the forwarding-destination module has no empty. On the other hand, in the credit system, when the internal buffer of the input port 140 of the forwarding-destination module has no empty, the output port 144 of the forwarding-destination module does not output the packet even if an inter-router buffer 18 which is provided between the routers 14a and 14b has the empty.

Figure 12:
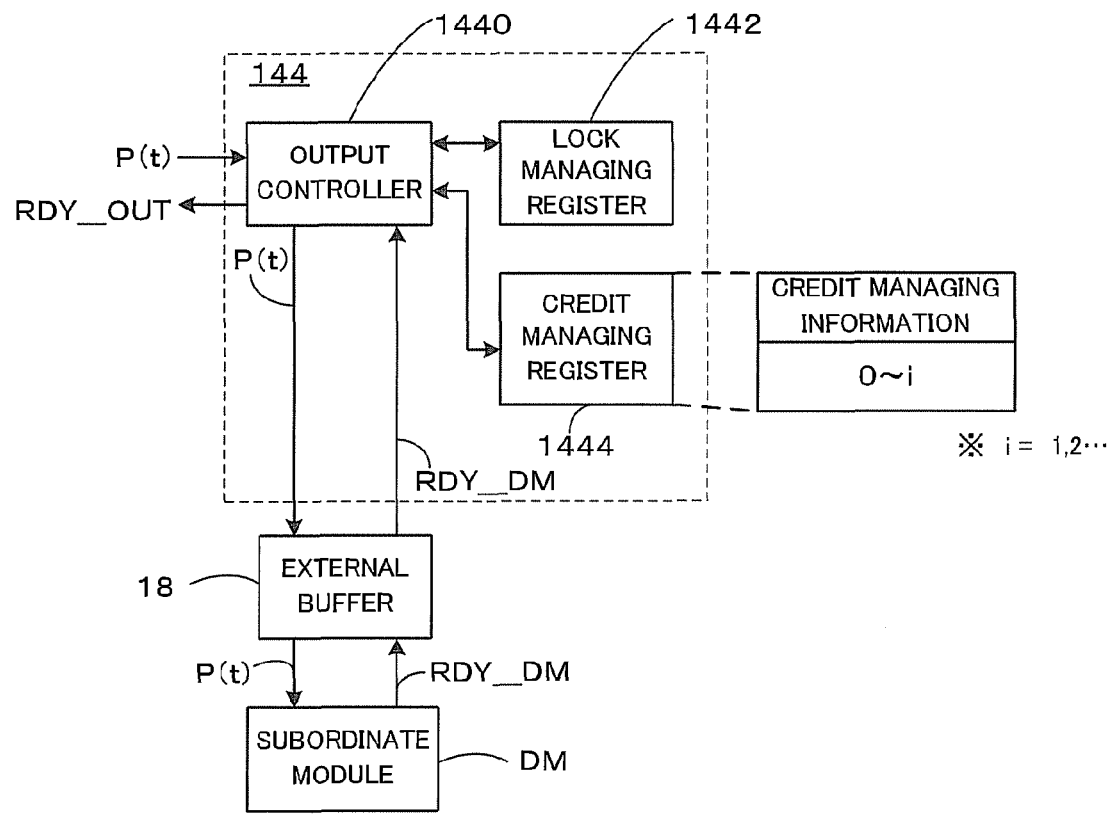
FIG. 12 is a block diagram illustrating a configuration of the output port 144 of the second embodiment.

FIG. 12 is a block diagram illustrating a configuration of the output port 144 of the second embodiment. The output port 144 includes a credit managing register 1444 in addition to the output controller 1440 and the lock managing register 1442.

The output controller 1440 sets credit managing information to the credit managing register 1444. The credit managing information includes information (for example, N credit bits) indicating the number of flits that can be outputted. For example, the credit bit of "0" indicates that the number of flits that can be outputted is zero (that is, the state in which the output port 144 cannot output any flits), and the credit bit of "3" indicates that the number of flits that can be outputted is three. The output controller 1440 updates the credit managing information on the basis of a ready signal RDY_DM that is transmitted from a subordinate module DM through the inter-router buffer 18.

Figure 13:
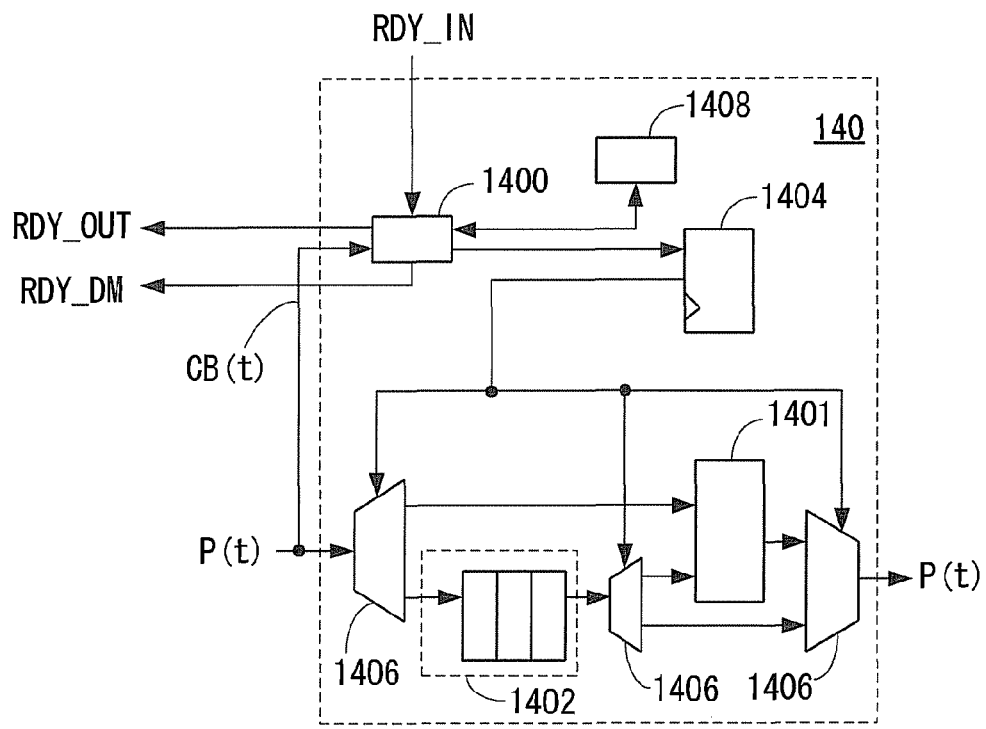
FIG. 13 is a block diagram illustrating a configuration of the input port 140 of the second embodiment.

FIG. 13 is a block diagram illustrating a configuration of the input port 140 of the second embodiment. The input port 140 includes a credit counter 1408 in addition to the input controller 1400, the first and second buffers 1401 and 1402, the lock control register 1404, and the selector 1406.

The input controller 1400 selects the inter-router flow control system on the basis of the output port state information set to the lock control register 1404. Specifically, the input controller 1400 selects the valid system in the case that the output port state information indicates the unlock state, and the input controller 1400 selects the credit system in the case that the output port state information indicates the lock state.

Moreover, the input controller 1400 sets a credit count to the credit counter 1408. The credit count indicates free spaces (for example, the number of buffers in each of which the flit can be stored) of the first and second buffers 1401 and 1402.

Figure 14:
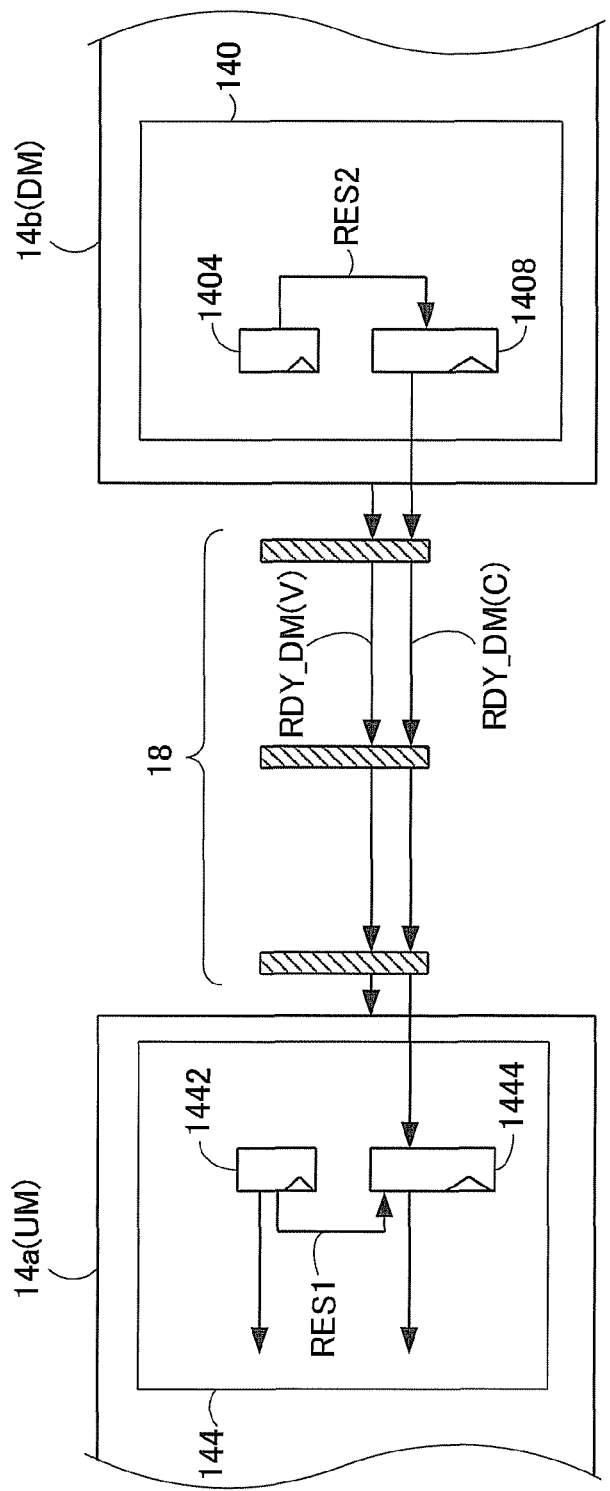
FIG. 14 is an explanatory view of the forwarding of the packet P(t) between the routers 14a and 14b of the second embodiment.

The inter-router packet forwarding of the second embodiment will be described. FIG. 14 is an explanatory view of the forwarding of the packet P(t) between the routers 14a and 14b of the second embodiment. FIG. 14 illustrates a state in which the router 14a (first module UM) forwards the packet P(t) to the router 14b (second module DM).

The output port 144 of the router 14a forwards the packet P(t) to the input port 140 of the router 14b through the inter-router buffer 18. As to the flow control system between the routers 14a and 14b, the valid system is selected in the case that the input port 140 is in the unlock state, and the credit system is selected in the case that the input port 140 is in the lock state.

In the case that the valid system is selected, after forwarding the packet P(t) stored in the buffer 1401 or 1402 to the output port (not illustrated) of the router 14b, the input controller 1400 of the router 14b transmits a ready signal RDY_DM(V) for the valid system to the router 14a through the inter-router buffer 18. The ready signal RDY_DM(V) indicates that the router 14b can receive the packet from the router 14a.

On the other hand, in the case that the credit system is selected, the lock managing register 1442 of the router 14a provides a reset signal RES1 to reset the credit managing information to the credit managing register 1444 under the control of the output controller 1440. Therefore, the credit managing information set to the credit managing register 1444 is reset. Furthermore, the lock control register 1404 of the router 14b provides a reset signal RES2 to reset the credit count to the credit counter 1408 under the control of the input controller 1400. Therefore, the credit count set to the credit counter 1408 is reset. After the reset, the credit count indicates the number of first and second buffers 1401 and 1402 that can be used at the time the credit count is reset.

In the credit system, the input controller 1400 adds 1 to the credit count of the credit counter 1408 every time each flit of the packet P(t) forwarded from the output port 144 of the router 14a is stored in the buffer 1401 or 1402. Furthermore, after forwarding each flit of the packet P(t) to the output port, the input controller 1400 subtracts 1 from the credit count of the credit counter 1408, and transmits a ready signal RDY_DM(C) for the credit system to the router 14a through the inter-router buffer 18.

In the credit system, when forwarding the packet P(t) to the input port 140 of the router 14b, the output controller 1440 adds 1 to the credit bit, which is correlated with input port identification information n corresponding to the input port 140 to which the packer P(t) is forwarded, of the credit managing information of the credit managing register 1444. When receiving the ready signal RDY_DM(C) for the credit system, the output controller 1440 subtracts 1 from the credit bit, which is correlated with the input port identification information n corresponding to the input port 140 that transmits the ready signal RDY_DM(C) for the credit system.

According to the second embodiment, the valid system is selected in the case that the output port 144 of the router 14a (first module) and the input port 140 of the router 14b (second module) are in the unlock state, and the credit system is selected in the case that the output port 144 and the input port 140 are in the lock state. Therefore, the packet forwarding latency can further be improved compared with the first embodiment.

At least a portion of the router 14 according to the above-described embodiments may be composed of hardware or software. When at least a portion of the router 14 is composed of software, a program for executing at least some functions of the router 14 may be stored in a recording medium, such as a flexible disk or a CD-ROM, and a computer may read and execute the program.

The recording medium is not limited to a removable recording medium, such as a magnetic disk or an optical disk, but it may be a fixed recording medium, such as a hard disk or a memory.

In addition, the program for executing at least some functions of the router 14 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A router comprising:
a plurality of input ports configured to receive a packet comprising control information indicating a type of access, each of the input ports comprising a first buffer and a second buffer which store the packet, each of the input ports comprising a first channel configured to store the packet in the first buffer through the second buffer and output the packet, a second channel configured to store the packet in the second buffer and output the packet directly without using the first buffer, and a third channel configured to store the packet directly in the first buffer without using the second buffer and output the packet; and
a plurality of output ports configured to output the packet, wherein each of the input ports selects, as a forwarding channel, one channel from the first channel, the second channel, and the third channel, on the basis of the control information and a state of the output port serving as a destination port of the packet.

2. The router of claim 1, wherein at least one of the input ports further comprises:
   a lock control register configured to store output port state information indicating the state of the output port serving as the destination port of the packet; and
   an input controller configured to set the output port state information to the lock control register on the basis of the control information.

3. The router of claim 1, wherein at least one of the input ports selects the first channel when the output port serving as the destination port of the packet is in an unlock state.

4. The router of claim 1, wherein at least one of the input ports selects the second channel, when the output port serving as the destination port of the packet is in a lock state, and when the packet comprises control information indicating normal access that is not associated with lock and unlock of the output port serving as the destination port of the packet.

5. The router of claim 1, wherein at least one of the input ports selects the third channel, when the output port serving as the destination port of the packet is in the lock state, and when the packet comprises control information indicating unlock access that is associated with the unlock of the output port serving as the destination port of the packet in the lock state and information indicating access from the at least one of the input ports that is locked together with the output port serving as the destination port of the packet.

6. The router of claim 1, wherein the output port serving as the destination port of the packet comprises a lock managing register configured to store lock managing information indicating at least one of the input ports that is locked together with the output port serving as the destination port of the packet.

7. A many-core system comprising:
   a plurality of cores configured to issue a packet comprising control information indicating a type of access;
   a plurality of routers configured to forward the packet;
   wherein each of the routers comprises:
   a plurality of input ports configured to receive the packet, each of the input ports comprising a first buffer and a second buffer which store the packet, each of the input ports comprising a first channel configured to store the packet in the first buffer through the second buffer and output the packet, a second channel configured to store the packet in the second buffer and output the packet directly without using the first buffer, and a third channel configured to store the packet directly in the first buffer without using the second buffer and output the packet; and
   a plurality of output ports configured to output the packet, and
   wherein each of the input ports selects, as a forwarding channel, one channel from the first channel, the second channel, and the third channel, on the basis of the control information and a state of the output port serving as a destination port of the packet.

8. The system of claim 7, wherein at least one of the input ports further comprises:
   a lock control register configured to store output port state information indicating the state of the output port serving as the destination port of the packet; and
   an input controller configured to set the output port state information to the lock control register on the basis of the control information.

9. The system of claim 7, wherein at least one of the input ports selects the first channel when the output port serving as the destination port of the packet is in an unlock state.

10. The system of claim 7, wherein at least one of the input ports selects the second channel, when the output port serving as the destination port of the packet is in a lock state, and when the packet comprises control information indicating normal access that is not associated with lock and unlock of the output port serving as the destination port of the packet.

11. The system of claim 7, wherein at least one of the input ports selects the third channel, when the output port serving as the destination port of the packet is in the lock state, and when the packet comprises control information indicating unlock access that is associated with the unlock of the output port serving as the destination port of the packet in the lock state and information indicating access from the at least one of the input ports that is locked together with the output port serving as the destination port of the packet.

12. The system of claim 7, wherein the output port serving as the destination port of the packet comprises a lock managing register configured to store lock managing information indicating at least one of the input ports that is locked together with the output port serving as the destination port of the packet.

13. The system of claim 7, further comprising at least one inter-router buffer provided between the routers.

14. The system of claim 7, wherein a first router serving as a source router of the packet dynamically selects a flow control system to be used for transferring the packet between the routers from a valid system and a credit system.

15. The system of claim 14, wherein the first router serving as the source router selects the valid system when the input port of a second router serving as a destination router of the packet is unlocked, and selects the credit system when the input port of the second router serving as the destination router is locked.

* * * * *